Sept. 26, 1961   J. K. BRILL   3,001,567
SELF-LOCKING AND SELF-SEALING PLASTIC FASTENING DEVICES
Filed Oct. 6, 1955

INVENTOR
John K. Brill
BY Lancaster, Allwine & Rommel
ATTORNEYS

United States Patent Office 3,001,567
Patented Sept. 26, 1961

3,001,567
SELF-LOCKING AND SELF-SEALING PLASTIC FASTENING DEVICES
John K. Brill, 46 Hopkins Ave., Jamestown, N.Y.; Adelaide E. Brill, administratrix of said John K. Brill, deceased
Filed Oct. 6, 1955, Ser. No. 538,986
2 Claims. (Cl. 151—7)

This invention relates to one piece wrench receiving type nuts for use on screw threaded shanks, and is a continuation-in-part of my application for patent relating to lock nuts filed July 8, 1953, Serial No. 366,829, now abandoned.

The principal object of the present invention is to provide nuts which are self-locking and self-sealing when turned tight on screw threaded shanks, and against the work, and which, after placed for locking and sealing purposes, may be removed and reused still retaining the holding, locking and sealing characteristics to the desired extent, thus avoiding the replacement of the used nuts with new nuts in the event that the work must be dismembered for some such purposes as repair or replacement of parts thereof and re-assembled.

The present invention contemplates making the nuts, for the reception of screw threaded shanks, wholly of highly tough and rigid, but sufficiently resilient and deformable, resinous material, capable of being manufactured under injection molding processes. Broadly, this material is referred to as a synthetic linear polyamide.

While the present invention has certain features, applicable to a wholly threaded nut and a wholly unthreaded nut the present preferred embodiment is herein disclosed as a partially threaded nut. The locking action is accomplished by the displacement of the plastic material of the nut by the entering action of the cooperating screw, stud, bolt or other threaded member used in conjunction with the nut; and the resultant compressive reactionary force exerted against the threads of the cooperating threaded member by the plastic material of the nut. The sealing action is accomplished by extrusion or plastic cold flow of a beveled or coned portion of the plastic nut at its base and lower extremity into the clearance space between the threaded member and the adjacent walls of the hole admitting it, as the plastic nut is brought to bear firmly against the surface of the parts to be fastened together by the cooperating assembly of the threaded member and the plastic nut.

By way of example the nuts may be molded each as a one piece device containing a central bore coaxial with the axis of the nut. The bore may be partially threaded, with the thread leading inwardly from one end of the nut. The threading may be done during the molding or after molding as a secondary step in the production of the nut. The self-threading action is obtained after there has been threaded engagement of the nut with the threaded end of the shank, by relative turning movement of one with respect to the other, throughout the threaded zone of the nut, and which does not necessarily require the use of a wrench or application of any considerable hand twist; and then, when considerable resistance to turning is encountered, application of considerable torque, as by use of a wrench, causes the thread of the shank to impress mating threads in the remainder of the bore.

The self-locking action is obtained as the material of which the nut is made, is displaced by the advance of the threaded shank and nut, one with respect to the other, resulting in a counter compressive reaction of the material against the shank.

The self-sealing action is obtained as an annular conical protuberance, extending from a planar face of the nut at its end from which thread of the nut leads, comes into bearing with the work surrounding the shank and under continued drive torque until the annular conical protuberance is compressed and distorted inwardly toward the axis of the screw threaded shank and extrudes into the normally free space between the shank and the wall of the hole in the work which accommodates the shank.

In my aforesaid copending application Serial No. 366,829, I disclose that which is described as a cone on the working face of the nut, and I there state that the shape of the cone is not critical. Also, in the drawings of said application I do not show the so-called cone as being extruded into the normally free space above referred to, to any great extent, nor the working face or base of the nut in engagement with the work. I have discovered that, for efficiency in obtaining the self-sealing action and other desirable characteristics of the nut, the shape of the conical annular protuberance is critical to the extent hereinafter set forth.

Other objects and advantages of the present invention will be set forth is the following detailed description of a practical embodiment of my nut, taken in connection with the accompanying drawing, forming a part of this specification, and in which drawing.

Figure 4:
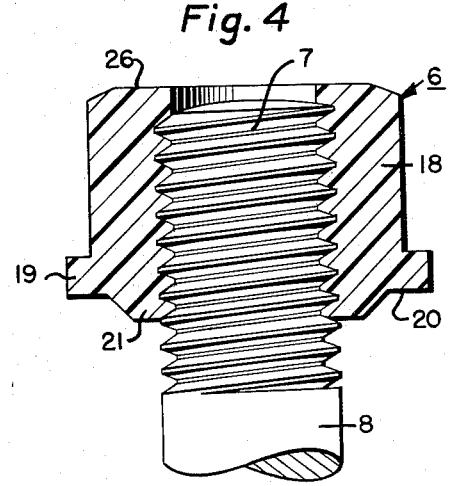
FIG. 4 is a fragmentary view in elevation of the screw threaded end of a shank, partially entered into the bore of the nut, the latter being shown in vertical section.
Figure 2:
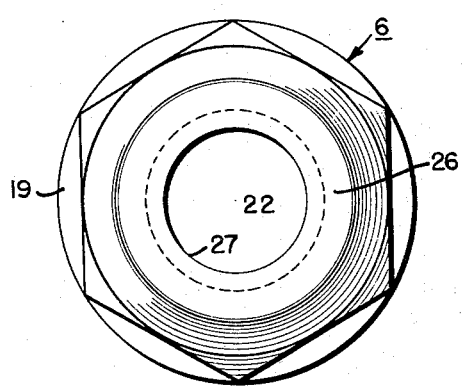
FIGS. 2 and 3 are top and bottom plan views, respectively of the same.
Figure 3:
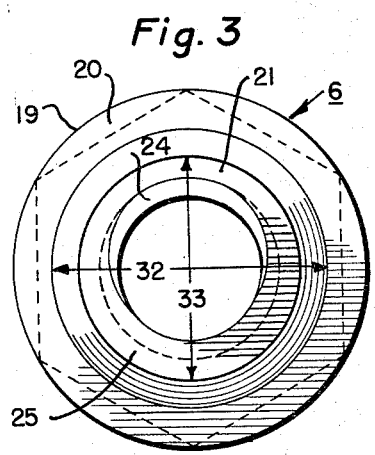
Figure 5:
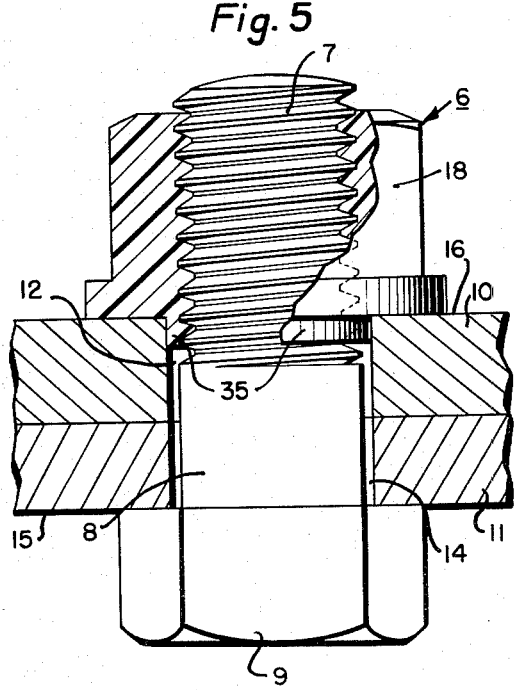
FIG. 5 is a view similar to FIG. 4 but also showing the shank as a part of a headed bolt which fastens together two pieces of work, and with the nut turned on the shank in locking relation thereto and in sealing relation to the work.

In the drawing 6 designates a fastener made according to the present invention, which, in FIGS. 4 and 5 are shown in association with the screw threaded end portion 7 of a shank 8, and in FIG. 5 the shank has a head 9 forming a bolt, with work pieces 10 and 11 secured together by the passage of the shank through openings 12 and 14 in the pieces 10 and 11, respectively, and with the head 9 engaging the exposed face 15 of plate 11 and the nut 6 turned tight against the exposed face 16 of piece 10.

The nut 6 essentially consists solely of synthetic linear polyamide. In practice I have found, at the present time, that such nylons commercially known as Du Pont FM 10001 and Du Pont Zytel 101 as having great tensile strength, and suitable physical, thermal and electrical characteristics.

The nut 6 in the example shown, comprises a body portion 18 of the usual hexagonal shape, hexagonal in this instance, providing a number of parallel companion wrench receiving faces, preferably provided with an integral annular base or washer-like flange 19, presenting a planar work engaging face 20 and an integral annular frusto-conical protuberance 21 extending from the planar face 20.

An axial bore 22 extends through the body portion 18 and protuberance 21, with the axis of the bore normal to the planar face 20, and, in the example shown, this bore is provided for a portion of its length with a screw thread 24 leading from the face of the smaller portion 25 of the protuberance 21 to a zone intermediate opposite ends of the body portion 18 and between this zone and the head face 26 of the portion 25, the bore presents a smooth cylindrical wall portion 27.

The thread 24, molded or otherwise formed in the nut, taking into consideration the size and thread characteristics of the threaded shank for which it is intended, is preferably made complementary to and for snug fit with the thread of the bolt or screw shank, that is, a close fit so that initial assembly of the nut on the shank can be accomplished by hand. The smooth cylindrical portion 27 of the bore is preferably of a diameter approximately the minor diameter of the screw that is to enter it.

Referring now to the protuberance 21 which is in the nature of a frustum of a cone having a height 30, a major diameter 32 and a minor diameter 33, I have discovered that the dimensions as to height, and major and minor diameters for use with a given size screw threaded shank, as follows:

Height 30 equals $$\text{Thread pitch of screw equals} \frac{1}{\text{No. of threads per inch}}$$

Major diameter 32 equals major diameter of screw, plus 2.250 thread pitch of screw Minor diameter 33 equals major diameter of screw, plus .250 thread pitch of screw While these dimensions may not be precisely adherred to, as in the example of a molded plastic nut, it has been found that, so proportioned, the angle of the frusto-conical protuberance is 45° and that this angle allows for a most efficient extrusion of surplus plastic material into the normally free or clearance space between the wall of opening 12 and the shank 8, as indicated at 35; allows the work engaging face 20 to bear with surface-to-surface contact against the face 16 of the work, as shown in FIGURE 5; and at the same time, creates a secondary lock between the nut and shank at the zone surrounding the threaded portion of the shank adjacent to the mouth of the opening 12, by compression of the plastics material into intimate contact with the thread of the shank.

Figure 1:
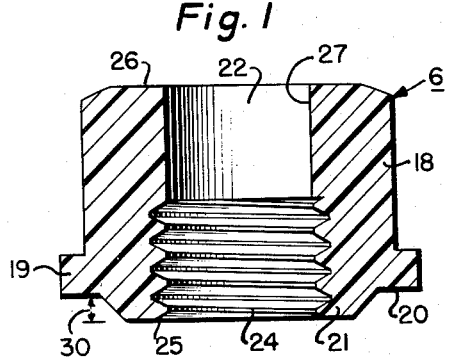
FIG. 1 is a central, vertical sectional view through the nut.

It will be obvious from an inspection of FIG. 4, after the nut 6 has been started on the threaded end 7 of the shank 8 and turned to the extent where the shank end engages the smooth cylindrical wall portion, the thread of the shank will, upon further relative movement between the nut and threaded shank, in the right direction, crowd the plastic material, located outwardly of the cylindrical wall portion 27, into very intimate contact with the threaded end portion of the shank without cutting a thread in the nut. This crowding of the plastic material results from the "screw feed" of the nut and threaded shank one with respect to the other occurring at the normally threaded zone of the nut. Also, this crowding of the plastic material at the zone of the nut where the cylindrical wall normally exists becomes a primary lock, but it has been found that, after the nut has thus been in use and is subsequently removed, the thread formation left in the normal smooth wall portion 27 does not entirely disappear but rather there is a resemblance to a threaded nut but with the thread of a somewhat rounded or bulging cross section. Likewise, the protuberance 21 while not resuming its normal cross section shown in FIGS. 1 and 4, does not retain the contour to which it has been pressed while in use, but rather assumes a condition in readiness to again serve as a sealing medium and as a secondary lock when the nut is again put to use in the manner described.

In reduction to practice, it has been found that the form of nut with bore open at both ends illustrated in the drawing and referred to in the above description is efficient and practical; yet realizing that conditions concurrent with the adoption of the principle of the invention applied to other types of nuts, such as cap nuts, thumb nuts, etc., will necessarily vary, it is desired to emphasize the fact that various minor changes in construction, design and configuration may be resorted to, when required, without sacrificing any of the advantages of the invention, as defined in the appended claims.

I claim:

1. A one-piece wrench receiving type of nut having a main body portion, said main body portion being provided with a bore for reception, with intimate contact, the thread of a screw threaded shank, said main body portion having a planar work engaging face normal to the axis of the bore and an annular frusto-conical protuberance extending from said body portion at said face, concentric with said bore, and having its interior wall substantially a continuation of the wall of the bore, said nut consisting solely of synthetic linear polyamide, and provided with at least opposite, parallel wrench receiving faces to facilitate turning the nut circumferentially with respect to the shank.

2. A one-piece wrench receiving type of nut having a main body portion, said main body portion being provided with a bore for reception, with intimate contact, the thread of a screw threaded shank, said main body portion having a planar work engaging face normal to the axis of the bore, and an annular frusto-conical protuberance extending from said body portion at said face, concentric with said bore, the height of the protuberance equalling substantially $$\text{Thread pitch} = \frac{1}{\text{No. of threads per inch}}$$

the minor diameter of the protuberance equalling substantially major diameter of shank at threaded portion, plus .250 pitch and, the major diameter of the protuberance equalling substantially major diameter of shank at threaded portion, plus 2.250 pitch, said nut consisting solely of synthetic linear polyamide and provided with at least opposite, parallel wrench receiving faces to facilitate turning the nut circumferentially with respect to the shank.

References Cited in the file of this patent

UNITED STATES PATENTS

| | | |
|---|---|---|
| 632,422 | McLaughlin | Sept. 5, 1899 |
| 1,356,404 | Robinson | Oct. 19, 1920 |
| 1,470,271 | Burn | Oct. 9, 1923 |
| 2,390,726 | Mitchell | Dec. 11, 1945 |
| 2,439,415 | Bloomfield | Apr. 13, 1948 |
| 2,545,514 | Erb | Mar. 20, 1951 |
| 2,549,939 | Shaw et al. | Apr. 24, 1951 |
| 2,669,700 | Rauch | Feb. 16, 1954 |
| 2,788,047 | Rapata | Apr. 9, 1957 |
| 2,788,829 | Edwards | Apr. 16, 1957 |